(12) United States Patent
Jeon

(10) Patent No.: US 9,911,230 B2
(45) Date of Patent: Mar. 6, 2018

(54) METHOD AND APPARATUS FOR CONTROLLING VIRTUAL MONITOR

(75) Inventor: Kwang Ha Jeon, Namyangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1599 days.

(21) Appl. No.: 13/373,930

(22) Filed: Dec. 6, 2011

(65) Prior Publication Data

US 2012/0139914 A1    Jun. 7, 2012

(30) Foreign Application Priority Data

Dec. 6, 2010 (KR) ........................ 10-2010-0123313

(51) Int. Cl.
*G06T 19/00* (2011.01)
*G06F 3/01* (2006.01)

(52) U.S. Cl.
CPC ............ *G06T 19/006* (2013.01); *G06F 3/011* (2013.01); *G06T 2210/04* (2013.01); *G06T 2210/21* (2013.01); *G06T 2210/52* (2013.01)

(58) Field of Classification Search
CPC ........ G06T 19/00; G06T 17/20; G06T 19/006
USPC .......................... 345/419, 156, 158, 173, 633
See application file for complete search history.

(56) References Cited

U.S. PATENT DOCUMENTS

| | | | |
|---|---|---|---|
| 6,353,422 B1 * | 3/2002 | Perlman ............................. | 345/7 |
| 6,353,436 B1 | 3/2002 | Reichlen | |
| 6,492,978 B1 * | 12/2002 | Selig et al. .................... | 345/173 |
| 6,882,337 B2 * | 4/2005 | Shetter ......................... | 345/173 |
| 7,050,955 B1 * | 5/2006 | Carmel et al. .................... | 703/6 |
| 7,113,151 B2 * | 9/2006 | Kinebuchi ........................ | 345/8 |
| 7,190,331 B2 * | 3/2007 | Genc et al. ....................... | 345/9 |
| 7,248,232 B1 | 7/2007 | Yamazaki et al. | |
| 7,289,112 B2 * | 10/2007 | Yokoyama et al. .......... | 345/178 |
| 7,825,996 B2 * | 11/2010 | Yamada et al. ............... | 348/744 |
| 8,199,106 B2 * | 6/2012 | Sugaya et al. ................ | 345/157 |

(Continued)

FOREIGN PATENT DOCUMENTS

| | | |
|---|---|---|
| JP | 08-006708 A | 1/1996 |
| JP | 2009-294372 A | 12/2009 |

OTHER PUBLICATIONS

Ji-Sun Kim "Tangible User Interface for CAVE based on Augmented Reality Technique", Dec. 2005.*

*Primary Examiner* — Kimbinh T Nguyen
(74) *Attorney, Agent, or Firm* — Jefferson IP Law, LLP

(57) ABSTRACT

An apparatus and method for controlling a virtual monitor in an augmented reality display system are provided. The method for controlling a virtual monitor in an augmented reality display system, including a camera for photographing an image for determining a location of the virtual monitor and for photographing an image of a user's finger, and a graphic device including window images, includes parallel-processing the image for determining a location of the virtual monitor and the window images and mapping the window images to a set location to create the virtual monitor, extracting a finger tip from the image of the user's finger, stencil-buffering an image of the finger tip not to render the image of the finger in the virtual monitor, determining whether the finger tip collides with the stencil-buffered virtual monitor, and controlling an operation of the virtual monitor according to the determination of the finger tip collision.

14 Claims, 6 Drawing Sheets
(3 of 6 Drawing Sheet(s) Filed in Color)

(56) References Cited

U.S. PATENT DOCUMENTS

| | | | |
|---|---|---|---|
| 2004/0186631 A1* | 9/2004 | Ohta | 700/303 |
| 2005/0088365 A1* | 4/2005 | Yamazaki et al. | 345/8 |
| 2006/0122819 A1* | 6/2006 | Carmel et al. | 703/21 |
| 2011/0063231 A1* | 3/2011 | Jakobs et al. | 345/173 |
| 2011/0141009 A1* | 6/2011 | Izumi | 345/156 |
| 2012/0242698 A1* | 9/2012 | Haddick et al. | 345/633 |

* cited by examiner

US 9,911,230 B2

METHOD AND APPARATUS FOR CONTROLLING VIRTUAL MONITOR

PRIORITY

This application claims the benefit under 35 U.S.C. § 119(a) of a Korean patent application filed on Dec. 6, 2010 in the Korean Intellectual Property Office and assigned Serial No. 10-2010-0123313, the entire disclosure of which is hereby incorporated by reference.

BACKGROUND OF THE INVENTION

1. Field of the Invention

The present invention relates to an augmented reality display apparatus and method. More particularly, the present invention relates to an apparatus capable of implementing a virtual monitor other than a physical monitor, and a method thereof.

2. Description of the Related Art

In recent years, based on advances in technologies that support multi-media applications, the demand for a work station that includes a plurality of monitors has increased. The use of a plurality of monitors is effective to widen a display area of a computer program that is executing on a single computer system. That is, installation of a plurality of monitors is advantageous in that it allows a user to view a larger display area while only using one computer. However, when implementing a computer system including the foregoing multi-monitors, a user typically must separately purchase respective monitors. As such, when implementing a multi-monitor system as mentioned above, use of the multi-monitor system increases the overall system burden with respect to the cost of the additional monitor. Even further, since a multi-monitor system is typically installed on a user's desk, the system size is limited based on the size of the desk, which causes a spatial restriction.

SUMMARY OF THE INVENTION

Aspects of the present invention are to address at least the above-mentioned problems and/or disadvantages and to provide at least the advantages described below. Accordingly, an aspect of the present invention is to provide a method for creating and controlling a virtual monitor in an augmented reality environment.

Another aspect of the present invention is to provide a method for creating and controlling a virtual multi-monitor without requiring additional space or increasing a cost in an augmented reality environment.

In accordance with an aspect of the present invention, an apparatus for controlling a virtual monitor in an augmented reality display system is provided. The apparatus includes a camera for photographing an image for determining a location of the virtual monitor and for photographing an image of a user's finger, a graphic device including window images, a Parallel Tracking and Mapping (PTAM) processor for parallel-processing the image for determining a location of the virtual monitor and the window images and for mapping the window images to a set location to create the virtual monitor, a finger tip extractor for extracting a finger tip from the image of the user's finger, a stencil buffer for stencil-buffering an image of the finger tip not to render the image of the finger in the virtual monitor, a collision determinator for determining whether the finger tip collides with the stencil-buffered virtual monitor, and a function processor for controlling an operation of the virtual monitor according to whether the finger tip collides with the stencil-buffered virtual monitor.

In accordance with another aspect of the present invention, a method for controlling a virtual monitor in an augmented reality display system, including a camera for photographing an image for determining a location of the virtual monitor and for photographing an image of a user's finger, and a graphic device including window images is provided. The method includes parallel-processing the image for determining a location of the virtual monitor and the window images and mapping the window images to a set location to create the virtual monitor, extracting a finger tip from the image of the user's finger, stencil-buffering an image of the finger tip not to render the image of the finger in the virtual monitor, determining whether the finger tip collides with the stencil-buffered virtual monitor, and controlling an operation of the virtual monitor according to whether the finger tip collides with the stencil-buffered virtual monitor.

In an exemplary implementation, the method for controlling the virtual monitor in an augmented reality display system further includes receiving and compensating for the image of the user's finger using a Rentinex algorithm to compensate for a unique color in the image of the user's finger changed due to illumination.

In yet another exemplary implementation, parallel-processing of the image for determining a location of the virtual monitor and the window images includes tracking the image for determining the location to extract characteristic points, forming a three-dimensional space using the extracted characteristic points to determine a location of the virtual monitor, forming a plane at the determined location of the virtual monitor using openGL, and mapping the window image on the formed plane to form the virtual monitor. Parallel-processing of the image for determining a location of the virtual monitor and the window images may include repeating parallel processing of the image for determining the location and the window images according to a user setting to form virtual multi-monitors at different locations. Extracting of the finger tip may include separating a finger from the compensated image of the finger using a Convex hull algorithm, and determining a direction of the finger from a center of an area and a center of a contour to extract the finger tip. Controlling of the operation of the virtual monitor may include controlling the operation of the virtual monitor according to a determination result of the collision processor, and expressing the operation of the virtual monitor in a three-dimensional space such that a user views the expressed operation of the virtual monitor.

The use of a method for creating and controlling a virtual multi-monitor according to an exemplary embodiment of the present invention may reduce a cost and a spatial restriction according to utilization of a plurality of multi-monitors for multiple work. In addition, an exemplary method for controlling a virtual multi-monitor as illustrated above may become capable of removing a restriction on the size of a monitor in a mobile device as well as a desktop computer.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
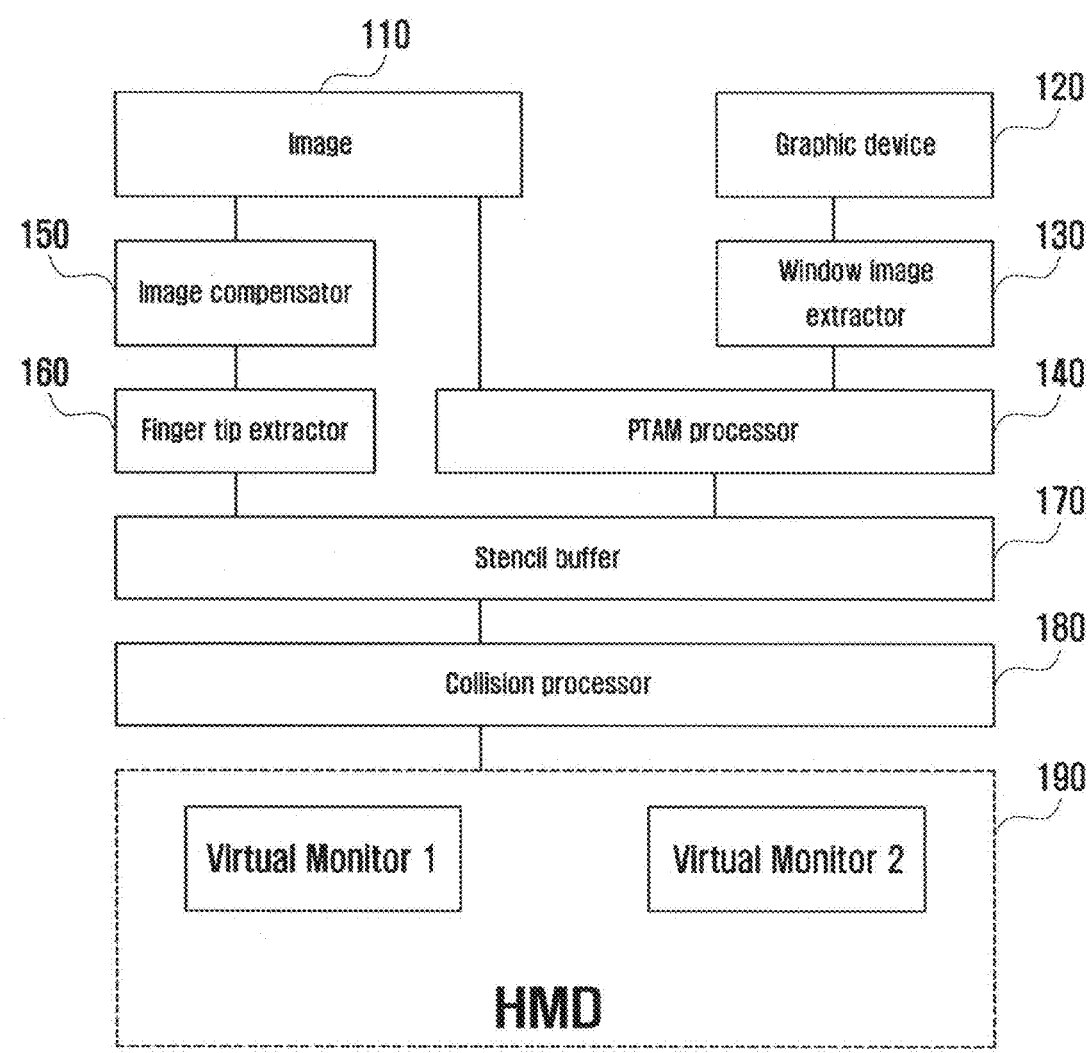
FIG. 1 is a block diagram illustrating an operation of an augmented reality display system according to an exemplary embodiment of the present invention.

FIG. 1 is a block diagram illustrating an operation of an augmented reality display system according to an exemplary embodiment of the present invention.

Referring to FIG. 1, an image 110 may be acquired by a camera or other equipment for capturing an image. The image 110 may become an image for a virtual monitor or an image of a user's finger for performing a pointing function of the virtual monitor. A graphic device 120 includes window images for creating a virtual monitor. A window image extractor 130 extracts a window image to be used as an image of the virtual monitor from the graphic device 120. Windows collected in the virtual monitor are continuous images, and images of the windows may be output in a virtual space to create a virtual multi-monitor. A Parallel Tracking And Mapping (PTAM) processor 140 estimates a location of a camera in a virtual space through parallel processing. The PTAM processor 140 parallel-processes the image for the virtual monitor and the extracted window image to determine a location of the virtual monitor, and creates the virtual monitor at the determined location. That is, the PTAM processor 140 may configure a virtual space using natural characteristics.

An image compensator 150 receives and compensates for an image of a user's finger through the image 110. In an exemplary implementation, the image compensator 150 compensates for the image of the finger using a Retinex algorithm, which produces an image that is robust to illumination. A finger tip extractor 160 extracts finger tip data from the compensated image of a user finger using a convex hull. By this process, the extracted finger tip image is used to control the virtual monitor.

A stencil buffer 170 renders only switched-on pixels. That is, the stencil buffer 170 performs a control operation not to render the finger tip image extracted from the finger tip extractor 160 in the virtual monitor created by the PTAM processor 140 such that an object of the virtual monitor may be controlled by a finger.

A collision processor 180 performs a collision processing function for a mutual action between the object of the virtual monitor and the user's finger, and the user generates a state signal for operating the virtual monitor with a finger through the collision processing function.

A Head Mounted Display (HMD) 190 displays the foregoing created virtual multi-monitors and senses an operation state of the user generated by the collision processor 180 to control an operation of a corresponding multi-monitor.

An exemplary operation of an augmented reality multi-monitor will be described with reference to FIG. 1.

An image 110 may be acquired by a camera. In this case, the image 110 may be an image for determining an installed location of the virtual monitor or an image for detecting a user's finger to control an operation of the virtual monitor. That is, the user acquires an image for determining a location to install a virtual monitor using a camera, and an image for a user's finger to control an operation of the virtual monitor.

In an exemplary operation of processing an image of the user's finger, an image compensator 150 acquires an image of the user's finger that is robust to illumination using a Retinex algorithm. The Retinex algorithm performs an operation of removing an influence of illumination based on the principle that a color is obtained by multiplying a unique reflection R of a real target by illumination I as illustrated in the following equation:

$$B(x,y) = R(x,y) * I(x,y) \qquad \text{Equation 1}$$

where, B is a color, R is unique reflection, I is illumination.

Accordingly, the image compensator 150 generates an image compensating for a unique color of a finger to be removed due to the illumination I. The finger tip extractor 160 extracts a finger tip from an image that is robust to illumination I obtained from Equation 1 using a Convex hull. The Convex hull separates fingers through extraction of a skin color with the smallest polygon including a plurality of points, and extracts a finger tip using a Convex hull. The finger tip information functions as a mouse point to control the virtual monitor. The user should know a direction of a finger to generate a single point such as a mouse point. The direction of a finger can be obtained based on a center of gravity of a finger area and a center of gravity of a finger contour. The center of gravity of the finger contour is located at an upper position of the finger area. That is why there are more contours in a finger than in a palm. As described previously, if the user obtains the direction of a finger, a dot product of the following Equation 2 is obtained based on main data and a center of gravity of the finger obtained using the Convex hull. As the cosine value of the dot product is reduced, the variable B approaches a direction of the finger. The extracted value functions as a mouse point.

$$\vec{A} \cdot \vec{B} = |\vec{A}||\vec{B}|\cos\theta \qquad \text{Equation 2}$$

An exemplary operation of creating the virtual monitor is now described. As described earlier, an image 110 includes an image for determining a location of the virtual monitor. A window image may be mapped to the image for determining the location of the virtual monitor to express the virtual monitor. A graphic device 120 includes window images. A window image extractor 130 extracts a window image to be mapped to the image for determining the location from the graphic device 120. The image for determining the location and the extracted window image are transferred to a PTAM processor 140 such that the virtual monitor is configured. In an exemplary implementation, an Operating System (OS) such as Linux may fetch a virtual monitor image through a library function of xgetwindows. The OS maps image data of a window continuously displayed on a physical monitor to the virtual monitor. An environment creating the virtual monitor is implemented in an augmented reality environment.

The term "augmented reality" denotes an environment augmenting virtual data in reality, and there is a manner using natural characteristics from a simple library such as ARToolkit therein. The PTAM 140 configures an augmented reality environment using natural characteristics. The PTAM processor 140 performs parallel processing to estimate its location through a continuous image read by a camera to create a three-dimensional virtual space. The PTAM processor 140 configures a visual effect of a three-dimensional space by estimating a depth using two cameras using two continuous frames by a stereo initialization. The PTAM processor 140 may create a plurality of multi-monitors using window data extracted from the configured three-dimensional space. As described previously, the PTAM processor 140 creates a virtual monitor in a three-dimensional space using the image for determining the location and the window image.

The stencil buffer 170 inputs a user's finger processed by the finger tip extractor 160 and a virtual monitor created by the PTAM processor 140, and makes a finger lift above the created virtual monitor. A virtual object is created through a graphic library such as OpenGL. Because a rendering procedure of drawing a virtual object is performed later, virtual data is always located above finger information read by the camera. Accordingly, it is substantially impossible to touch a virtual object. Accordingly, there is a need for virtual data and depth information of a real user. An exemplary embodiment of the present invention uses a method of operating a virtual object through a stencil buffer 170 other than depth information. An exemplary embodiment of the present invention may extract a finger from the compensated image from the image compensator 150 not to render a virtual object above the finger such that a user's finger touches the virtual object. Touching the virtual object is detected by the collision processor 180. The user reflects location information of a three-dimensional monitor in a two-dimension manner to use a finger on a virtual object as a mouse point. When a click operation of a finger occurs, it is determined whether a finger point is located in a pixel of a monitor menu counterclockwise to cause an event operation.

The foregoing operation is displayed through an HMD 190. Accordingly, since a user views a virtual monitor while using the HMD 190, persons except for the actual user cannot view the monitor and thus a security function is provided. Although one HMD is expensive and a plurality of virtual monitors are created through the HMD, a monitor cost for a multi-monitor may be reduced. This approach may become substitute for removing a restriction on the monitor size in a mobile device as well as a desktop computer.

Figure 2:
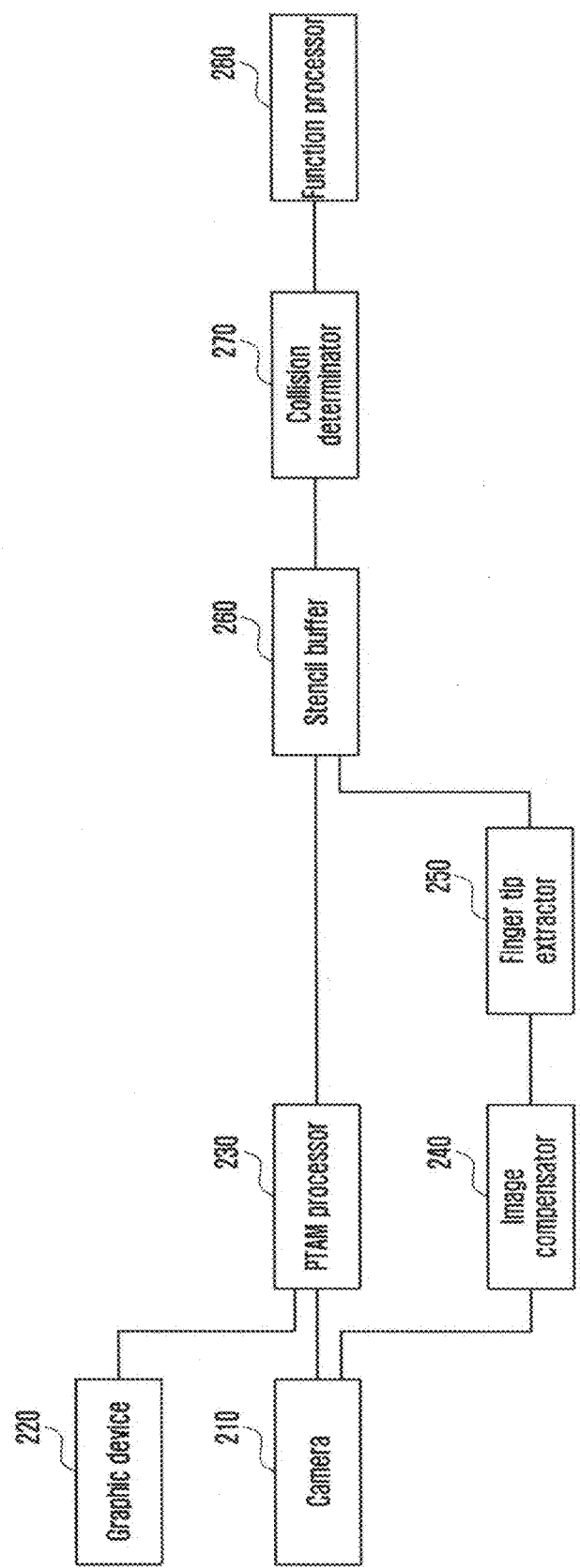
FIG. 2 is a block diagram illustrating a configuration of an apparatus for implementing a virtual multi-monitor other than a physical monitor in an augmented reality display system according to an exemplary embodiment of the present invention.

FIG. 2 is a block diagram illustrating a configuration of an apparatus for implementing a virtual multi-monitor other than a physical monitor in an augmented reality display system according to an exemplary embodiment of the present invention.

Referring to FIG. 2, a camera 210 acquires an image for determining a location of a virtual monitor for displaying the virtual monitor and an image of a user's finger for controlling an operation of the created virtual monitor. The image for determining the location photographed by the camera 210 may be an image for determining a location of a virtual monitor in which the virtual monitor will be installed. Further, a graphic device 220 includes window images for generating a virtual monitor. The image for determining the location and the window image are transferred to a PTAM processor 230. The PTAM processor 230 creates three-dimensional virtual monitors through augmented reality using the image for determining the location and the window image.

An exemplary operation of the PTAM processor 230 is described. The PTAM processor 230 tracks the image for determining the location to extract characteristic points. In this case, the PTAM processor 230 may detect corners of the image for determining the location using a Simultaneous Localization And Mapping (SLAM) algorithm to extract characteristic points, and form a three-dimensional space using the characteristic points. The PTAM processor 230 determines a location of a monitor for creating a virtual monitor in the formed three-dimensional space. The PTAM processor 230 makes a plane of the virtual monitor, the location of which is determined. In an exemplary implementation, the plane of the virtual monitor is made using openGL. The PTAM processor 230 reads a window image for creating the virtual monitor from the graphic device 220. That is, the PTAM processor 230 parallel-processes the image for determining the location acquired from the camera and the window image read from the graphic device 220 to determine a location and a plane of the virtual monitor and to map the window image to the determined location and plane of the virtual monitor, thereby creating the virtual monitor.

As described previously, if the user determines the location of the virtual monitor through the camera 210, the PTAM processor 230 fixes the virtual monitor to a corresponding position, and maps the window image selected by the user to the location of the virtual monitor to create the virtual monitor. Upon repeating the foregoing operation, the PTAM processor 230 may create virtual multi-monitors having different window images or the same window image in different locations in an augmented reality environment.

The user may extract a finger image for controlling an operation of the created virtual monitor as mentioned above. To do this, the user photographs a finger through the camera 210, and provides an image of the photographed finger to the image compensator 240. In an exemplary implementation, the image compensator 240 compensates for an image of the finger using a Retinex algorithm. In this case, a unique color in the image of the photographed finger may be removed according to a photographing condition of an illumination lamp. Accordingly, the image compensator 240 compensates for an image of the finger using the Retinex algorithm not to remove the unique color of the finger.

At this time, the image compensated from the image compensator 240 may be an image of a total finger. More specifically, a finger controlling the virtual monitor may be a finger tip. Accordingly, to control an operation of the virtual monitor, a finger tip of the user should be known. A finger tip detector 250 detects a finger tip from an image of the finger output from the image compensator 240. The finger tip detector 250 measures an area of the image of the finger to remove small points (namely, noise). Further, the finger tip detector 250 may extract a region of the finger using a unique color of the finger, and perform a binarizing operation to express the region of the finger with black. The finger tip detector 250 secures characteristics of the finger using a contour, and extracts a finger tip using a convex hull algorithm. Upon extraction of the finger tip, the finger tip extractor 250 determines a direction of the finger using a center of an area and a center of a contour to extract the finger tip. That is, because the center of an area is located in the back of the finger and the center of a contour is located in a side of the finger, the finger tip extractor 250 may extract the finger tip using them, and remove characteristic points of the contour in a finger back direction to remove an unnecessary contour.

The detected finger tip as described above may perform a function (e.g., function of mouse) of controlling an operation of a virtual monitor. In this case, if the detected finger tip is rendered on the virtual monitor, a control operation of a monitor may not be performed. As described previously, this is why virtual data are always located above an image of the finger read by the camera, in which case a virtual object is created through a graphic library such as OpenGL. In this case, it is substantially impossible to touch the virtual object. Thus, there is a need for virtual data and depth information of a real user finger. Accordingly, an exemplary embodiment of the present invention operates the virtual object through a stencil buffer 260 other than the depth information. To do this, the stencil buffer 260 stencil-buffers the virtual monitor created by the PTAM processor 230 and the image of the finger tip extracted from the finger tip extractor 250 not to render the finger tip in the virtual monitor. That is, the stencil buffer 260 protrudes a region of the finger tip above a virtual space such that the image of the finger tip may collide on the virtual monitor.

Accordingly, since the virtual monitor output from the stencil buffer 260 is not rendered with the image of the finger tip, an operation making the finger tip touch the virtual monitor may be performed. Accordingly, a collision determinator 270 may determine collision of the finger tip with the virtual monitor to control an operation of a monitor. For example, when the finger tip is set to be recognized as a mouse operation, a tip point of a finger is set to a point (that is, setting a region of the virtual monitor in which a finger is located to a mouse click point). When the presence of a click is set to be determined based on the number of fingers, the collision determinator 270 may determine the number of fingers in a location of a finger tip to determine the presence of a click.

A function processor 280 expresses the foregoing virtual monitor. The function processor 280 may be implemented by HMD. Accordingly, the function processor 280 displays the virtual monitor, and may control an operation of the virtual monitor and display a controlled operation state by the collision determinator 270.

As illustrated earlier, the PTAM processor 230 may set a location of the virtual monitor through an image for determining the location acquired through the camera 210, create a monitor plane through openGL, read a window image from the graphic device 220 to make a plane of the virtual monitor at the set location, and map the window image on the made plane of the virtual monitor to form the virtual monitor. Further, the PTAM processor 230 compensates for an image of a user's finger acquired through the camera 210 with a unique color of the finger, and extracts a finger tip of the user from the compensated image of the finger and uses the extracted finger tip of the user as an input means for controlling an operation of the virtual monitor. To touch-control the virtual monitor in a virtual space using the finger tip, the stencil buffer 260 protrudes a region of the finger above a virtual space (that is, stencil-buffers the extracted image of the finger tip not to render the extracted finger tip with the virtual monitor), and the collision determinator 270 determines whether the finger tip touches the virtual monitor (presence of collision). Accordingly, the function processor 280 controls an operation of the virtual monitor according to whether or not the finger tip touches, and expresses a controlled state, which may be implemented by HMD.

Figure 3:
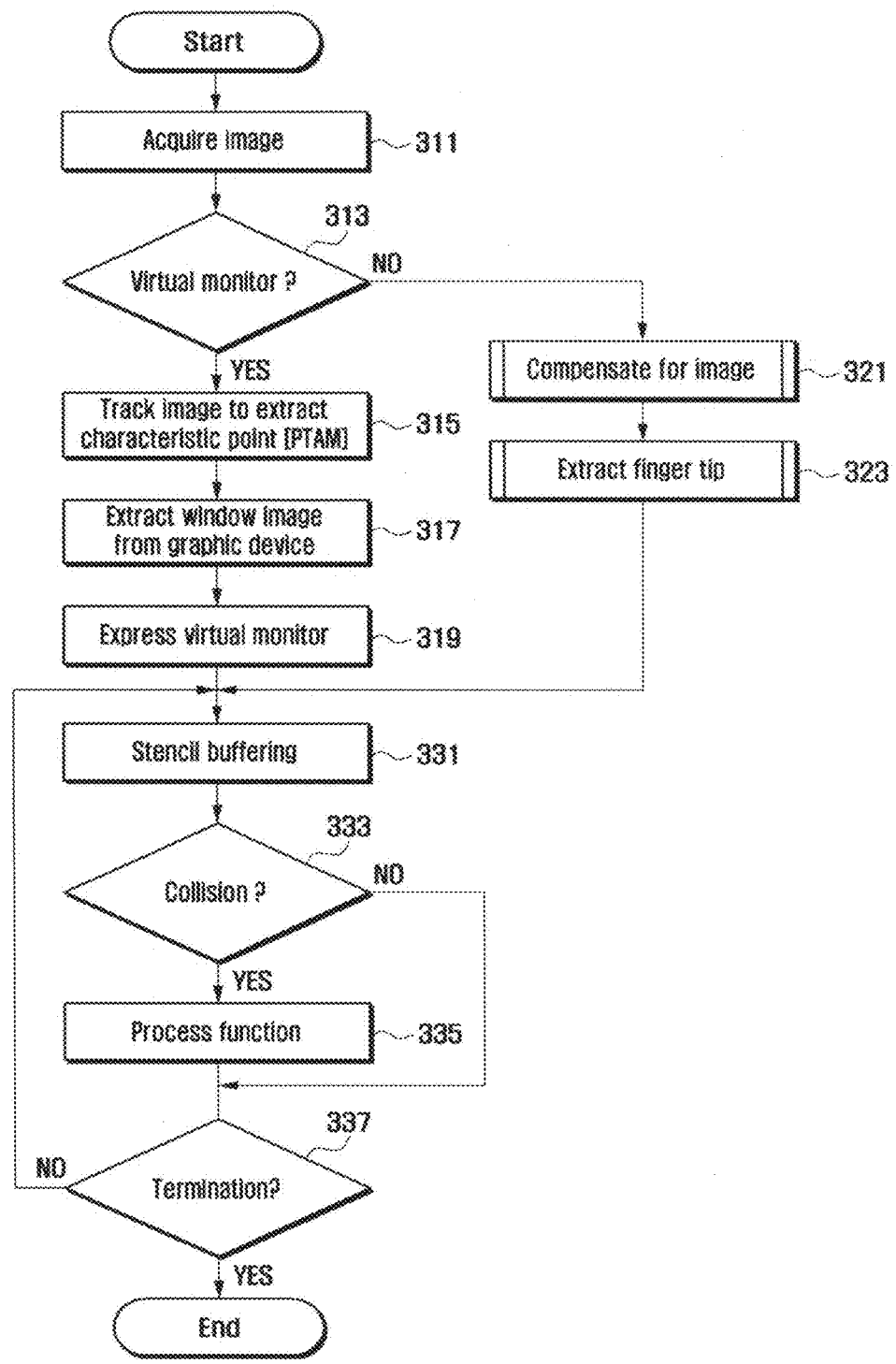
FIG. 3 is a flowchart illustrating a method for implementing a virtual multi-monitor other than a physical monitor in an augmented reality display system according to an exemplary embodiment of the present invention.

FIG. 3 is a flowchart illustrating a method for implementing a virtual multi-monitor other than a physical monitor in an augmented reality display system according to an exemplary embodiment of the present invention.

Referring to FIG. 3, an augmented reality display system acquires an image through a camera in step 311. In this case, the image may be an image for determining a location of a virtual monitor or an image of a user's finger. When the image is an image for determining a location of a virtual monitor, the augmented reality display system senses it in step 313 and tracks (namely, PTAM-processes) the image to extract characteristic points in step 315. The augmented reality display system performs the PTAM processing operation to determine a location of a virtual monitor according to the acquired image and to form a plane at the determined location of the virtual monitor. Subsequently, the augmented reality display system extracts a window image from the graphic device in step 317, and maps the extracted window image to the plane of the virtual monitor and expresses it as the virtual monitor in step 319. Here, steps 315 to 319 may become a PTAM processing procedure.

If it is determined at step 313 that the acquired image is an image of the user's finger, the augmented display system compensates for the acquired image of the user's finger using a Retinex algorithm to compensate for a change in a unique color in the finger due to illumination in step 321. The augmented reality display system extracts a finger tip from the compensated image of the finger in step 323. In an exemplary implementation, a procedure for extracting the finger tip may use a Convex hull. The Convex hull separates a finger through extraction of a finger skin color with a polygon including a plurality of points and extracts a finger tip. The finger tip information functions as a mouse point to control the virtual monitor.

As described previously, after forming the virtual monitor and extracting the finger tip, the augmented reality display system stencil-buffers the virtual monitor and the finger tip image in step 331. If the stencil buffering operation is performed, a virtual monitor and the finger tip image are not rendered, which may provide a space feeling causing a finger touch the virtual monitor. The augmented display system determines the presence of collision in step 333. For example, an approach for determining the presence of collision may determine a tip point of a finger as a point (that is, determines a touched location of the finger as a point of a mouse), and determine the number of fingers to determine the presence of click. It is determined that the collision occurs, the augmented reality display system processes a corresponding function in step 335. In this case, the procedure for processing the function may be implemented by HMD. At this time, the user may view the virtual monitor using the HMD and determine whether a finger tip collides on the virtual monitor to determine a state that the operation of the virtual monitor is controlled. If it is determined in step 335 that a collision does not occur, or after step 335, it is determined in step 337 whether the process is terminated. If the process is not terminated in step 337, the process returns to step 331 and performs subsequent steps.

Figure 4:
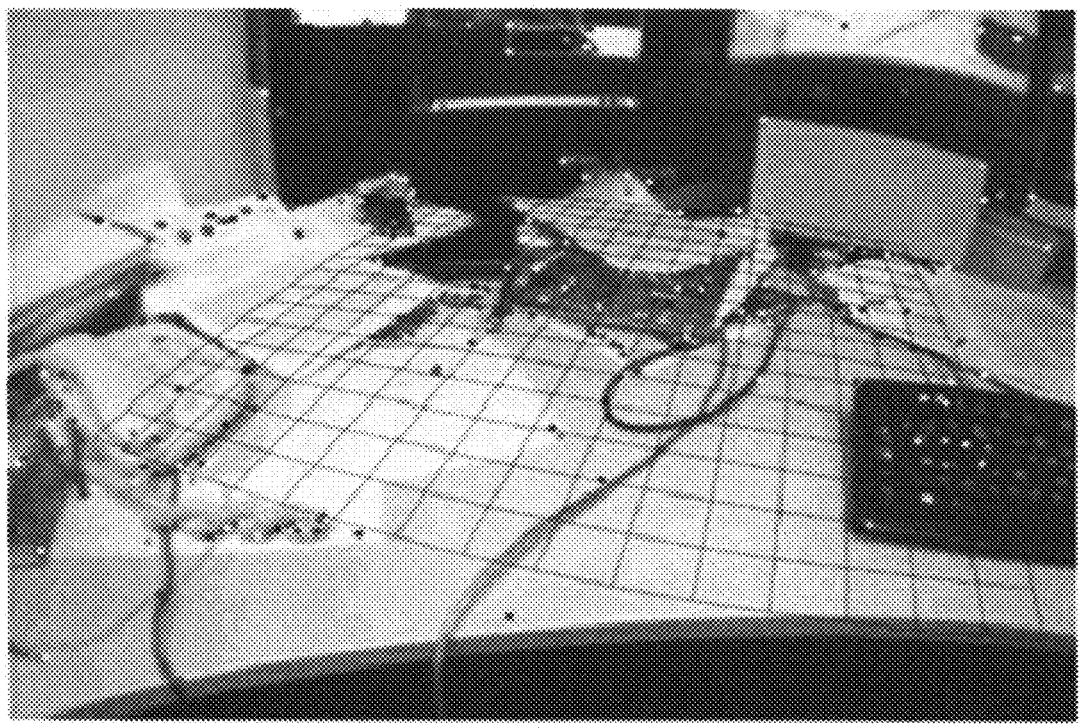
FIG. 4 is a view illustrating an example of an image configuring a virtual space using Parallel Tracking And Mapping (PTAM) instead of a physical monitor installed on a desk according to an exemplary embodiment of the present invention.

FIG. 4 is a view illustrating an example of an image configuring a virtual space using PTAM instead of a physical monitor installed on a desk according to an exemplary embodiment of the present invention. Referring to FIG. 4, an example of processing an image for determining the location acquired through a camera by a PTAM processor to form a virtual space is illustrated.

Figure 5:
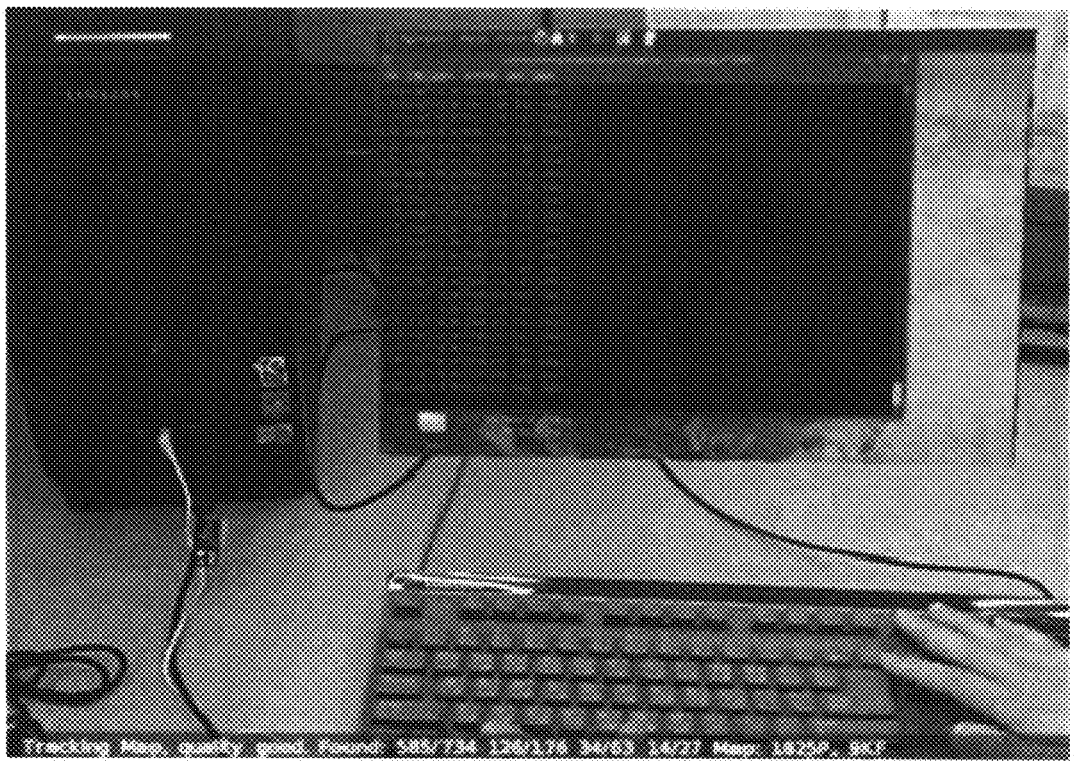
FIG. 5 is a view illustrating a screen creating a virtual monitor in a virtual space according to an exemplary embodiment of the present invention.

FIG. 5 is a view illustrating a screen creating a virtual monitor in a virtual space according to an exemplary embodiment of the present invention. Referring to FIG. 5, an example of forming a plane at a location of an image acquired from a camera through openGL, and mapping a window image on the formed plane to form the virtual monitor by the PTAM processor is illustrated.

Figure 6:
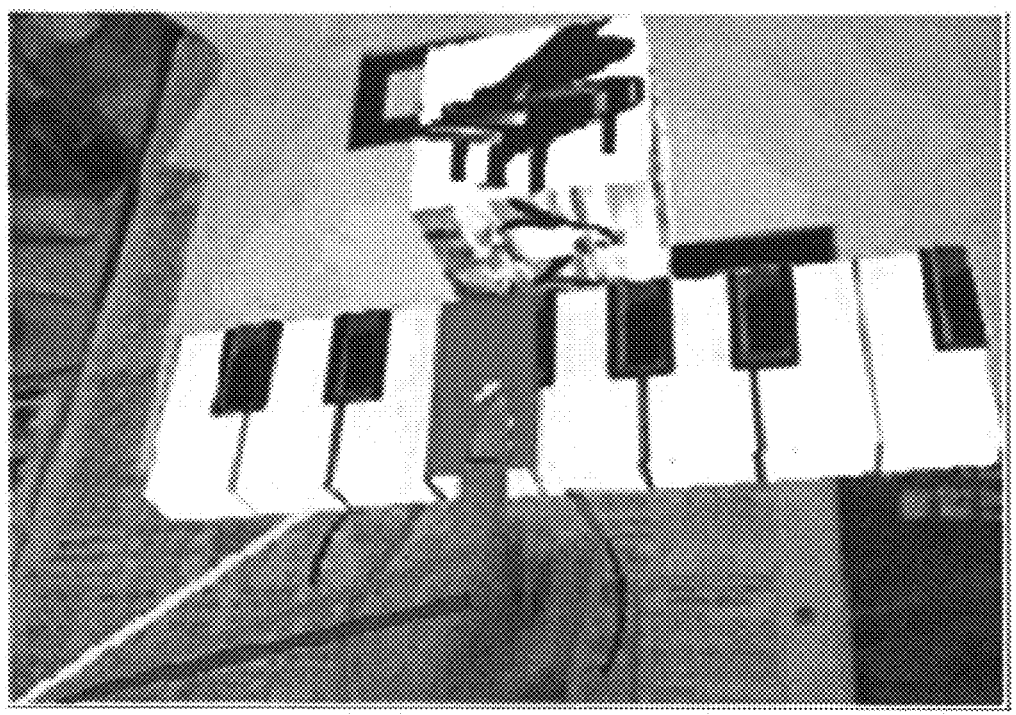
FIG. 6 is a view illustrating an example for determining the presence of collision such that a finger tip image is not rendered on a virtual monitor through stencil buffering in an augmented reality display system according to an exemplary embodiment of the present invention.

FIG. 6 is a view illustrating an example for determining the presence of collision such that a finger tip image is not rendered on a virtual monitor through stencil buffering in an augmented reality display system according to an exemplary embodiment of the present invention. As mentioned above, a virtual space is an environment that may create various present and absent objects. An exemplary embodiment of the present invention may create and operate a virtual monitor in a virtual space to reduce a spatial restriction and cost through a multi-monitor.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for controlling a virtual monitor in an augmented reality display system, the apparatus comprising:
   a camera configured to photograph an image for determining a location of the virtual monitor and for photographing an image of a user's finger;
   a graphic device storing at least one window image;
   a Parallel Tracking And Mapping (PTAM) processor configured to parallel process the image for determining a location of the virtual monitor, and to locate the at least one window image to display the virtual monitor at a set location;
   a finger tip extractor configured to extract a finger tip from the image of the user's finger;
   a stencil buffer configured to buffer information of the finger tip not to render the image of the finger in the virtual monitor such that an object of the virtual monitor is controlled by the fingertip extracted from the image of the user's finger;
   a collision determinator configured to determine whether the finger tip collides with an object in the virtual monitor, the object of the virtual monitor controlled by the fingertip extracted; and
   a function processor configured to control an operation of the virtual monitor according to whether the finger tip collides with the object in the virtual monitor.

2. The apparatus of claim 1, further comprising an image compensator configured to receive and compensate for the image of the user's finger using a Rentinex algorithm to compensate for and to transfer, to the finger tip extractor, a unique color in the image of the user's finger changed due to illumination.

3. The apparatus of claim 2, wherein the Retinex algorithm performs an operation of removing an influence of the illumination using the following equation:

$$B(x,y)=R(x,y)*I(x,y)$$

where, B is a color, R is a unique reflection, I is the illumination, and (x,y) is the location of a pixel.

4. The apparatus of claim 2, wherein the PTAM processor tracks the image for determining the location to extract characteristic points, forms a three-dimensional space using the extracted characteristic points to determine a location of the virtual monitor, forms a plane at the determined location of the virtual monitor using openGL, and maps the window image on the formed plane to form the virtual monitor.

5. The apparatus of claim 4, wherein the PTAM processor repeats parallel processing the image for determining the location and the window images according to a user setting to form virtual multi-monitors at different locations.

6. The apparatus of claim 5, wherein the finger tip extractor separates a finger from the compensated image of a finger using a Convex hull algorithm, and determines a direction of a finger from a center of an area and a center of a contour to extract the finger tip.

7. The apparatus of claim 6, wherein the function processor comprises a head mount display unit, controls an operation of the virtual monitor according to a determination result of the collision processor, and expresses the operation of the virtual monitor in a three-dimensional space.

8. A method for controlling a virtual monitor in an augmented reality display system, including a camera for photographing an image for determining a location of the virtual monitor and for photographing an image of a user's finger, and a graphic device storing at least one window image, the method comprising:
   parallel-processing the image for determining a location of the virtual monitor, and locating the at least one window image to display the virtual monitor at a set location;
   extracting a finger tip from the image of the user's finger;
   buffering information of the finger tip not to render the image of the finger in the virtual monitor such that an object of the virtual monitor is controlled by the fingertip extracted from the image of the user's finger;

determining whether the finger tip collides with an object in the virtual monitor, the object of the virtual monitor controlled by the fingertip extracted; and controlling an operation of the virtual monitor according to whether the finger tip collides with the object in the virtual monitor.

9. The method of claim 8, further comprising receiving and compensating for the image of the user's finger using a Rentinex algorithm to compensate for a unique color in the image of the user's finger changed due to illumination.

10. The method of claim 9, wherein the using of the Retinex algorithm comprises performing an operation of removing an influence of the illumination using the following equation:

$$B(x,y)=R(x,y)*I(x,y)$$

where, B is a color, R is a unique reflection, I is the illumination, and (x,y) is the location of a pixel.

11. The method of claim 9, wherein the parallel-processing of the image for determining a location of the virtual monitor and the window images comprises:

tracking the image for determining the location to extract characteristic points;

forming a three-dimensional space using the extracted characteristic points to determine a location of the virtual monitor;

forming a plane at the determined location of the virtual monitor using openGL; and mapping the window image on the formed plane to form the virtual monitor.

12. The method of claim 11, wherein the parallel-processing of the image for determining a location of the virtual monitor and the window images comprises: repeating parallel processing of the image for determining the location and the window images according to a user setting to form virtual multi-monitors at different locations.

13. The method of claim 12, wherein the extracting of the finger tip comprises:

separating a finger from the compensated image of a finger using a Convex hull algorithm; and determining a direction of the finger from a center of an area and a center of a contour to extract the finger tip.

14. The method of claim 13, wherein, the controlling of the operation of the virtual monitor comprises:

controlling an operation of the virtual monitor according to a determination result of the collision processor; and expressing the operation of the virtual monitor in a three-dimensional space such that a user views the expressed operation of the virtual monitor.

* * * * *